(12) United States Patent
Qian (10) Patent No.: US 10,116,746 B2
(45) Date of Patent: Oct. 30, 2018

(54) DATA STORAGE METHOD AND NETWORK INTERFACE CARD

(71) Applicant: Huawei Technologies Co., Ltd., Shenzhen (CN)

(72) Inventor: Feili Qian, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 298 days.

(21) Appl. No.: 15/216,477

(22) Filed: Jul. 21, 2016

(65) Prior Publication Data

US 2016/0330283 A1 Nov. 10, 2016

Related U.S. Application Data

(63) Continuation of application No. PCT/CN2015/076991, filed on Apr. 20, 2015.

(30) Foreign Application Priority Data

Jun. 20, 2014 (CN) .......................... 2014 1 0279606

(51) Int. Cl.
   *G06F 15/16* (2006.01)
   *H04L 29/08* (2006.01)
   (Continued)

(52) U.S. Cl.
   CPC ........ *H04L 67/1097* (2013.01); *G06F 13/128* (2013.01); *H04L 29/06* (2013.01); *H04L 69/16* (2013.01); *G06F 13/28* (2013.01)

(58) Field of Classification Search
   CPC ... H04L 29/06; H04L 29/08072; H04L 69/16; H04L 69/06
   (Continued)

(56) References Cited

U.S. PATENT DOCUMENTS

| 6,226,680 B1 | 5/2001 | Boucher et al. |
| 6,775,693 B1 * | 8/2004 | Adams .................... G06F 13/28 709/213 |

(Continued)

FOREIGN PATENT DOCUMENTS

| CN | 1473300 A | 2/2004 |
| CN | 1818890 A | 8/2006 |

(Continued)

OTHER PUBLICATIONS

Foreign Communication From A Counterpart Application, European Application No. 15810575.9, Extended European Search Report dated May 31, 2017, 7 pages.

(Continued)

*Primary Examiner* — Khanh Dinh
(74) *Attorney, Agent, or Firm* — Conley Rose, P.C.

(57) ABSTRACT

A data storage method and a network interface card, where in this solution, buffered unsolicited data is written, in a direct memory access (DMA) manner, into storage space that corresponds to a destination address corresponding to the unsolicited data, and a rate of writing data in the DMA manner is higher than a rate of writing data in a copying manner. Therefore, time required in a data storage process is shortened and a storage efficiency is improved. In addition, because a write operation is performed by hardware of the network interface card, consumption of central processing unit (CPU) resources is reduced, which further reduces impact on processing rates of other application programs.

14 Claims, 8 Drawing Sheets

A network interface card acquires unsolicited data and buffers the acquired unsolicited data into buffer space of the network interface card, where the unsolicited data is to-be-stored data, for which a corresponding destination address is not acquired, among data received by the network interface card — 200

The network interface card acquires a destination address corresponding to the unsolicited data, and writes, in a DMA manner, the buffered unsolicited data into storage space that corresponds to the destination address corresponding to the unsolicited data — 210

(51) Int. Cl.
*H04L 29/06* (2006.01)
*G06F 13/12* (2006.01)
*G06F 13/28* (2006.01)

(58) Field of Classification Search
USPC .............................. 709/220, 228, 236, 238
See application file for complete search history.

(56) References Cited

U.S. PATENT DOCUMENTS

| | | | |
|---|---|---|---|
| 7,673,072 B2 * | 3/2010 | Boucher | H04L 69/16 370/230 |
| 7,835,380 B1 | 11/2010 | Aloni et al. | |
| 8,387,073 B1 | 2/2013 | Micalizzi et al. | |
| 2001/0047433 A1 | 11/2001 | Boucher et al. | |
| 2006/0168091 A1 | 7/2006 | Makhervaks et al. | |
| 2006/0168286 A1 | 7/2006 | Makhervaks et al. | |
| 2008/0126553 A1 * | 5/2008 | Boucher | H04L 69/16 709/230 |
| 2010/0174770 A1 * | 7/2010 | Pandya | G06F 17/30985 709/200 |
| 2011/0029847 A1 | 2/2011 | Goldenberg et al. | |
| 2011/0302476 A1 | 12/2011 | Lee et al. | |
| 2013/0223451 A1 | 8/2013 | Zur et al. | |

FOREIGN PATENT DOCUMENTS

| | | |
|---|---|---|
| CN | 1954574 A | 4/2007 |
| CN | 101673581 A | 3/2010 |
| CN | 102244579 A | 11/2011 |
| CN | 103200128 A | 7/2013 |
| CN | 103533075 A | 1/2014 |
| CN | 104063344 A | 9/2014 |

OTHER PUBLICATIONS

Foreign Communication From A Counterpart Application, Chinese Application No. 201410279606.3, Chinese Notice of Rejection dated Sep. 25, 2017, 7 pages.
Partial English Translation and Abstract of Chinese Patent Application No. CN104063344, dated Aug. 5, 2016, 3 pages.
Partial English Translation and Abstract of Chinese Patent Application No. CN103533075, dated Jan. 22, 2014, 8 pages.
Dedong, Z., et al., "A Kind of Data Flow Disaster Recovery Method Based on IP-SAN," Jan. 2012, 62 pages.
English Translation of Dedong, Z., et al., "A Kind of Data Flow Disaster Recovery Method Based on IP-SAN," Jan. 2012, 7 pages.
Foreign Communication From A Counterpart Application, Chinese Application No. 201410279606.3, Chinese Office Action dated Jul. 27, 2016, 10 pages.
Foreign Communication From A Counterpart Application, PCT Application No. PCT/CN2015/076991, English Translation of International Search Report dated Jun. 19, 2015, 2 pages.
Foreign Communication From A Counterpart Application, PCT Application No. PCT/CN2015/076991, English Translation of Written Opinion dated Jun. 19, 2015, 7 pages.

* cited by examiner

DATA STORAGE METHOD AND NETWORK INTERFACE CARD

CROSS-REFERENCE TO RELATED APPLICATIONS

This application is a continuation of International Application No. PCT/CN2015/076991, filed on Apr. 20, 2015, which claims priority to Chinese Patent Application No. 201410279606.3, filed on Jun. 20, 2014, both of which are hereby incorporated by reference in their entireties.

TECHNICAL FIELD

The present disclosure relates to the field of data storage technologies, and in particular, to a data storage method and a network interface card.

BACKGROUND

Figure 1A:
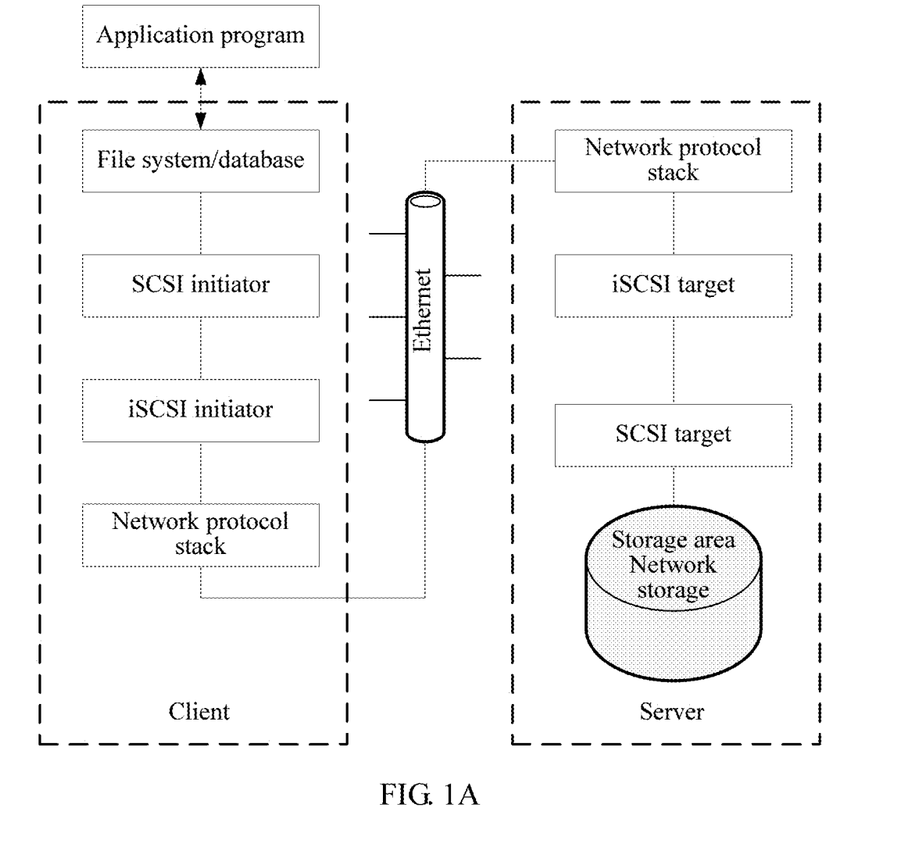
FIG. 1A is a schematic diagram of an SCSI protocol module.
Figure 1B:
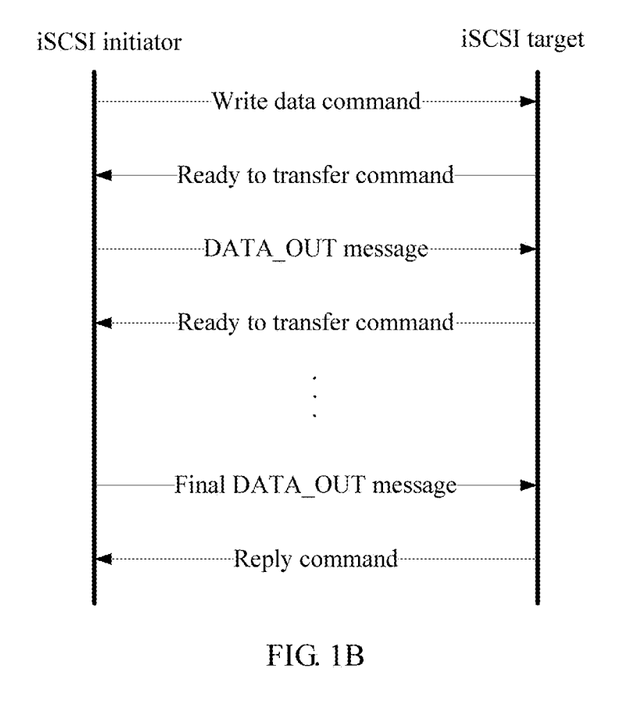
FIG. 1B is a flowchart of an SCSI protocol-based write operation.

With development of network technologies and the exponential growth of digital information, the importance of network storage is increasingly apparent, and multiple network storage technologies emerge. An internet small computer system interface (iSCSI) technology is a storage technology that runs the small computer system interface (SCSI) protocol on an internet protocol (IP) network. The iSCSI technology has been widely applied because the iSCSI technology has advantages of simple maintenance, easy-to-expand, and relatively low hardware costs. A schematic diagram of an SCSI protocol module is shown in FIG. 1A.

iSCSI data transfer primarily relates to read and write processes. FIG. 1B is a flowchart of write operation processing.

Step A: An iSCSI initiator sends a write data command to an iSCSI target.

Step B: After receiving the write data command, the iSCSI target allocates a destination address for all data to be written into network storage in a storage area, and sends the destination address to the iSCSI initiator using an ready to transfer (R2T) command.

Step C: The iSCSI initiator sends, to the iSCSI target, a request that carries the to-be-written data, namely, a DATA_OUT message, and the iSCSI target places, by means of copying or using a direct data placement (DDP) technology, the to-be-written data into storage space corresponding to the destination address.

Figure 1C:
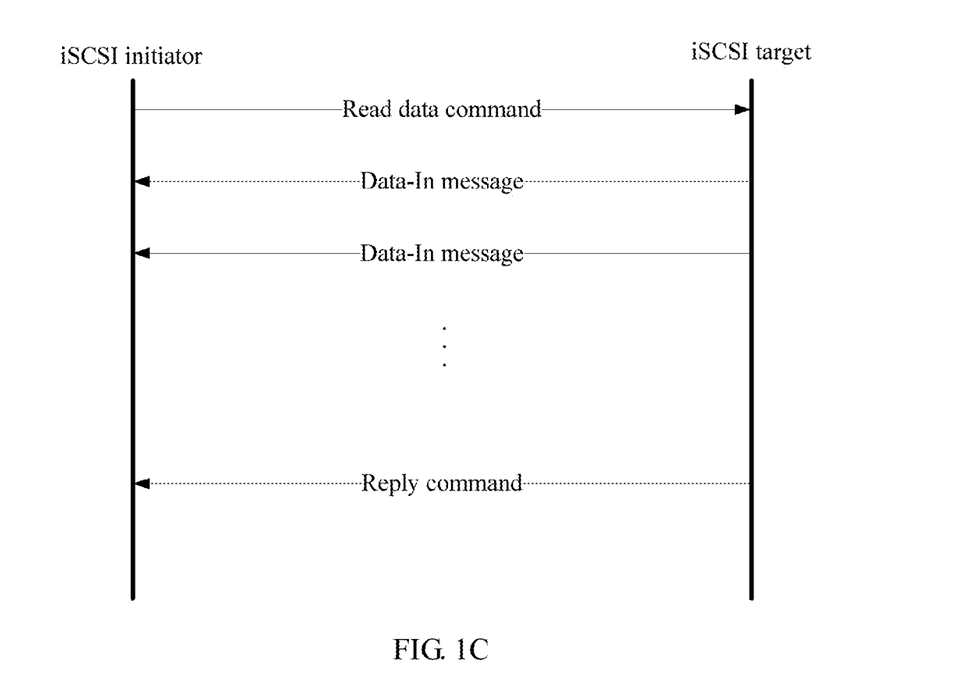
FIG. 1C is a flowchart of an SCSI protocol-based read operation.

FIG. 1C is a flowchart of read operation processing.

Step a: An iSCSI initiator sends a read data command to an iSCSI target.

In this step, the iSCSI initiator has determined a destination address of to-be-read data.

Step b: The iSCSI initiator receives a Data-In message sent by the iSCSI target, where the Data-In message carries data stored in storage space corresponding to the destination address.

In the write operation processing process shown in FIG. 1B, the iSCSI initiator actually sends data only after receiving an R2T command returned by the iSCSI target. In an actual application, much small-data storage exists in a process of storing data using the iSCSI technology. If a write operation is performed using the foregoing process, a defect of a relatively high transmission delay exists due to complicated interaction operations in a long-distance transmission process.

To reduce a transmission delay in small-data transmission, the interaction step of sending an R2T command is omitted in the iSCSI technology, which is implemented in the following two manners.

A first manner is in a form of a write data command: To-be-written small data is directly carried in a write data command.

A second manner is in a form of a first-sent unsolicited DATA_OUT message: To-be-written small data is directly carried in a first-sent unsolicited DATA_OUT message. The unsolicited DATA_OUT message that carries the to-be-written small data is sent immediately after a write data command, that is, there is no R2T command sent between an unsolicited DATA_OUT message and a write data command.

In the foregoing two manners, the iSCSI initiator may directly send to-be-written small data to the iSCSI target before receiving an R2T command returned by the iSCSI target. However, because the iSCSI target does not obtain a destination address of the to-be-written small data when receiving the to-be-written small data sent by the iSCSI initiator, the iSCSI target needs to perform buffering first when receiving the to-be-written small data sent by the iSCSI initiator.

Buffering to-be-written small data further includes that a host bus adapter (HBA) buffers the to-be-written small data at a driver layer after receiving the to-be-written small data sent by an iSCSI initiator. After the driver layer receives a destination address, delivered by an SCSI layer, of the to-be-written small data, the driver layer copies the buffered to-be-written small data to storage space corresponding to the destination address. It can be seen from the foregoing process that the driver layer stores, in a copying manner, the buffered to-be-written small data into the storage space corresponding to the destination address. However, storage in the copying manner has disadvantages of being time-consuming and low-efficiency. As a result, problems of being time-consuming and low-efficiency exist in a current storage process. In addition, a copying operation is performed at the driver layer, where the driver layer is a software layer, the software layer needs to occupy central processing unit (CPU) resources when performing an operation, and the CPU resources are limited. Therefore, the current data storage method imposes impact on processing rates of other application programs.

In conclusion, the prior-art data storage method has the disadvantages of being time-consuming, low in storage efficiency, and affecting processing rates of other application programs.

SUMMARY

Embodiments of the present disclosure provide a data storage method and a network interface card, which are used to address disadvantages, in a data storage process in the prior art, of being time-consuming, low in a storage efficiency, and affecting processing rates of other application programs.

Specific technical solutions provided in the embodiments of the present disclosure are as follows.

According to a first aspect, a data storage method is provided, including acquiring, by a network interface card, unsolicited data, and buffering the acquired unsolicited data into buffer space of the network interface card, where the unsolicited data is to-be-stored data, for which a corresponding destination address is not acquired, among data received by the network interface card, and acquiring, by the network interface card, a destination address corresponding to the unsolicited data, and writing, in a direct memory access (DMA) manner, the buffered unsolicited data into storage space that corresponds to the destination address corresponding to the unsolicited data.

With reference to the first aspect, in a first possible implementation manner, the unsolicited data is data carried in a write data command sent by a client, or the unsolicited data is data carried in an unsolicited DATA_OUT message sent by a client, where the unsolicited DATA_OUT message is a message that is received by the network interface card after receiving the write data command sent by the client and before sending a R2T command to the client.

With reference to the first aspect or the first possible implementation manner of the first aspect, in a second possible implementation manner, buffering, by the network interface card, the acquired unsolicited data into buffer space of the network interface card further includes buffering, by the network interface card and in the DMA manner, the unsolicited data into space of a random access memory (RAM) of the network interface card, or buffering, by the network interface card and in the DMA manner, the unsolicited data into space of a double data rate (DDR) synchronous dynamic random access memory (SDRAM) of the network interface card.

With reference to the first aspect or the first to second possible implementation manners of the first aspect, in a third possible implementation manner, before writing, by the network interface card and in a DMA manner, the buffered unsolicited data into storage space that corresponds to the destination address corresponding to the unsolicited data, the method further includes acquiring, by the network interface card, a data integrity field (DIF) calculation rule corresponding to the unsolicited data, calculating, by the network interface card using the DIF calculation rule, a DIF value corresponding to the unsolicited data, and determining, by the network interface card, that the DIF value obtained through calculation is equal to a preset DIF value corresponding to the unsolicited data.

With reference to the first aspect or the first to third possible implementation manners of the first aspect, in a fourth possible implementation manner, after writing, by the network interface card and in a DMA manner, the buffered unsolicited data into storage space that corresponds to the destination address corresponding to the unsolicited data, the method further includes determining, by the network interface card when determining that there is to-be-stored data not written into storage space, a size of storage space corresponding to a destination address of the to-be-stored data, adding, by the network interface card, the determined size of the storage space to an R2T command, and sending the command to the client, receiving, by the network interface card, to-be-stored data that is returned by the client according to the R2T command, and writing, by the network interface card, the received to-be-stored data into the storage space corresponding to the destination address of the to-be-stored data.

According to a second aspect, a network interface card is provided, including an acquiring unit configured to acquire unsolicited data and a destination address corresponding to the unsolicited data, where the unsolicited data is to-be-stored data, for which a corresponding destination address is not acquired, among data received by the acquiring unit, a buffering unit configured to buffer the acquired unsolicited data into buffer space of the network interface card, and a writing unit configured to write, in a direct memory access DMA manner, the buffered unsolicited data into storage space that corresponds to the destination address corresponding to the unsolicited data.

With reference to the second aspect, in a first possible implementation manner, the unsolicited data acquired by the acquiring unit is data carried in a write data command sent by a client, or the unsolicited data acquired by the acquiring unit is data carried in an unsolicited DATA_OUT message sent by a client, where the unsolicited DATA_OUT message is a message that is received by the acquiring unit after receiving the write data command sent by the client and before sending a R2T command to the client.

With reference to the second aspect or the first possible implementation manner of the second aspect, in a second possible implementation manner, the buffering unit is further configured to buffer, in the DMA manner, the unsolicited data into space of a RAM of the network interface card, or buffer, in the DMA manner, the unsolicited data into space of a DDR SDRAM of the network interface card.

With reference to the second aspect or the first to second possible implementation manners of the second aspect, in a third possible implementation manner, the network interface card further includes a determining unit, where the determining unit is configured to acquire a DIF calculation rule corresponding to the unsolicited data, calculate, using the DIF calculation rule, a DIF value corresponding to the unsolicited data, and determine that the DIF value obtained through calculation is equal to a preset DIF value corresponding to the unsolicited data.

With reference to the second aspect or the first to third possible implementation manners of the second aspect, in a fourth possible implementation manner, the writing unit is further configured to determine a size of storage space corresponding to a destination address of the to-be-stored data when there is to-be-stored data not written into storage space, add the determined size of the storage space to an R2T command, and send the command to the client, receive to-be-stored data that is returned by the client according to the R2T command, and write the received to-be-stored data into the storage space corresponding to the destination address of the to-be-stored data.

Beneficial effects of the present disclosure are as follows.

The embodiments of the present disclosure provide a data storage method, which includes acquiring, by a network interface card, unsolicited data, and buffering the acquired unsolicited data into buffer space of the network interface card, where the unsolicited data is to-be-stored data, for which a corresponding destination address is not acquired, among data received by the network interface card, acquiring, by the network interface card, a destination address corresponding to the unsolicited data, and writing, in a DMA manner, the buffered unsolicited data into storage space that corresponds to the destination address corresponding to the unsolicited data. In this solution, the buffered unsolicited data is written, in a DMA manner, into the storage space that corresponds to the destination address corresponding to the unsolicited data, and a rate of writing data in a DMA manner is higher than a rate of writing data in a copying manner. Therefore, time required in a data storage process is shortened and a storage efficiency is improved. In addition, because a write operation is performed by hardware of the network interface card, consumption of CPU resources is reduced, which further reduces impact on processing rates of other application programs.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

In addition, the terms "system" and "network" may be used interchangeably in this specification. The term "and/or" in this specification is only an association relationship for describing associated objects and represents that three relationships may exist. For example, A and/or B may represent the following three cases: only A exists, both A and B exist, and only B exists. In addition, the symbol "/" in this specification generally indicates an "or" relationship between the associated objects.

A driver layer stores, in a copying manner, buffered to-be-written small data into storage space corresponding to a destination address. However, storage in the copying manner has disadvantages of being time-consuming and low-efficiency. As a result, problems of being time-consuming and low-efficiency exist in a current storage process. In addition, a copying operation is performed at the driver layer, where the driver layer is a software layer, the software layer needs to occupy CPU resources when performing an operation, and the CPU resources are limited. Therefore, the current data storage method imposes impact on processing rates of other application programs. To address disadvantages of being time-consuming and low in a storage efficiency, and affecting processing rates of other application programs, the embodiments of the present disclosure provide a data storage method, which includes acquiring, by a network interface card, unsolicited data, and buffering the acquired unsolicited data into buffer space of the network interface card, where the unsolicited data is to-be-stored data, for which a corresponding destination address is not acquired, among data received by the network interface card, acquiring, by the network interface card, a destination address corresponding to the unsolicited data, and writing, in a DMA manner, the buffered unsolicited data into storage space that corresponds to the destination address corresponding to the unsolicited data. In this solution, the buffered unsolicited data is written, in a DMA manner, into the storage space that corresponds to the destination address corresponding to the unsolicited data, and a rate of writing data in a DMA manner is higher than a rate of writing data in a copying manner. Therefore, time required in a data storage process is shortened and a storage efficiency is improved. In addition, because a write operation is performed by hardware of the network interface card, consumption of CPU resources is reduced, which further reduces impact on processing rates of other application programs.

The following describes exemplary implementation manners of the present disclosure in detail with reference to the accompanying drawings in the specification. It should be understood that exemplary embodiments described herein are used merely to describe and explain the present disclosure but are not used to limit the present disclosure. In addition, the embodiments of the application and the features of the embodiments may be combined with each other if no contradiction occurs.

The following describes exemplary implementation manners of the present disclosure in detail with reference to the accompanying drawings.

Figure 2A:
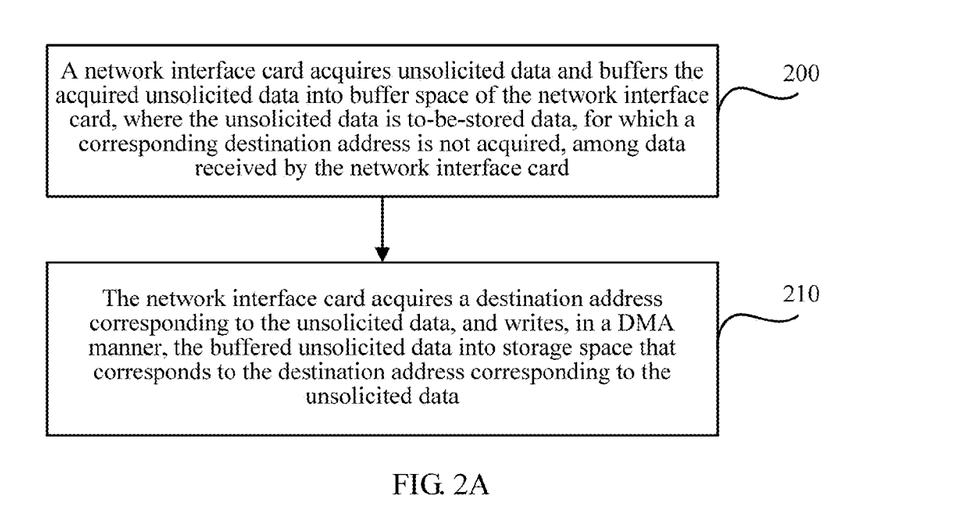
FIG. 2A is a detailed flowchart of storing data according to an embodiment of the present disclosure.

Referring to FIG. 2A, in an embodiment of the present disclosure, a detailed data storage process is as follows.

Step 200: A network interface card acquires unsolicited data and buffers the acquired unsolicited data into buffer space of the network interface card, where the unsolicited data is to-be-stored data, for which a corresponding destination address is not acquired, among data received by the network interface card.

Step 210: The network interface card acquires a destination address corresponding to the unsolicited data, and writes, in a DMA manner, the buffered unsolicited data into storage space that corresponds to the destination address corresponding to the unsolicited data.

In this embodiment of the present disclosure, there are multiple types of network interface cards, which, for example, may be a network card or an HBA, or certainly, may be in other forms in different application scenarios, which is not described in detail again herein.

In this embodiment of the present disclosure, the unsolicited data is in various forms, and optionally, may be in the following forms.

For example, the unsolicited data is data carried in a write data command sent by a client, that is, the network interface card may acquire the unsolicited data from the write data command.

For another example, the unsolicited data is data carried in an unsolicited DATA_OUT message sent by a client, that is, the network interface card may acquire the unsolicited data from the unsolicited DATA_OUT message, where the unsolicited DATA_OUT message is a message that is received by the network interface card after receiving a write data command sent by the client and before sending a R2T command to the client.

Certainly, in an actual application, the unsolicited data may also be in another form, which is not described in detail again herein.

In this embodiment of the present disclosure, the network interface card buffers the acquired unsolicited data into the buffer space of the network interface card in multiple manners, which, optionally, may be in the following manner.

For example, the network interface card buffers the unsolicited data into space of a RAM of the network interface card in the DMA manner, where the space of the RAM has an attribute that a DMA engine performs a DMA operation.

Alternatively, the following manner may also be used.

For example, the network interface card buffers the unsolicited data into space of a DDR SDRAM of the network interface card in the DMA manner.

In this embodiment of the present disclosure, the unsolicited data may be all data to be written into the storage space, or certainly, may be partial data to be written into the storage space. However, the write data command always carries a total size of all the data to be written into the storage space, which does not change with whether the unsolicited data is all the data to be written into the storage space.

For example, the write data command can carry only 5 kilobyte (KB) data, and the total size of all the data to be written into the storage space is 15 KB. Then, a size of data that is carried in the write data command and that is to be written into the storage space is 5 KB. If the write data command can carry 15 KB data, the unsolicited data is all the data to be written into the storage space. If the write data command can carry only 5 KB data, the unsolicited data is partial data to be written into the storage space.

In this embodiment of the present disclosure, when the network interface card writes, in the DMA manner, the unsolicited data buffered in the buffer space into the storage space that corresponds to a destination address corresponding to the unsolicited data, if the unsolicited data is buffered in the space of the RAM of the network interface card, the network interface card writes, in the DMA manner, the unsolicited data buffered in the space of the RAM into the storage space that corresponds to the destination address corresponding to the unsolicited data.

In this case, if the unsolicited data is buffered in the space of the DDR SDRAM of the network interface card, the network interface card writes, in the DMA manner, the unsolicited data buffered in the space of the DDR SDRAM into the storage space that corresponds to the destination address corresponding to the unsolicited data.

Figure 2B:
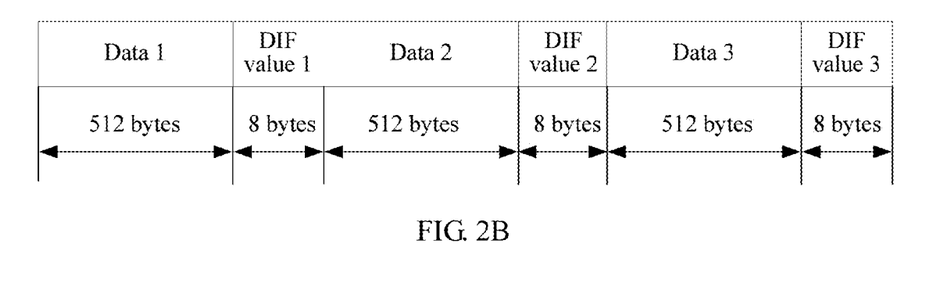
FIG. 2B is a schematic diagram of data and corresponding DIF values according to an embodiment of the present disclosure.

In an actual application, in a process of transmitting unsolicited data from a client to a network interface card, errors may be introduced due to a harsh environment, but these errors are absolutely not allowed in some scenarios that have strict requirements for data, for example, bank account information. Therefore, a DIF technology is further introduced for an iSCSI technology to determine integrity of data transmission. The DIF technology is an end-to-end data protection method. Data includes two parts, one part being valid data and the other part being a DIF value corresponding to the valid data. The DIF value includes eight bytes and is located after each piece of 512-byte valid data. That is, in sent data, each piece of 512-byte data is followed by a DIF value corresponding to the 512-byte data, as shown in FIG. 2B. In this figure, Data 1, Data 2, and Data 3 are all valid data, DIF value 1 corresponds to Data 1, DIF value 2 corresponds to Data 2, and DIF value 3 corresponds to Data 3. When sending unsolicited data, an iSCSI initiator in a client calculates a DIF value of the unsolicited data using a specified algorithm, and sends the DIF value. After receiving the unsolicited data, an SCSI layer in a server calculates, according to the unsolicited data, a DIF value corresponding to the unsolicited data. When the DIF value obtained through calculation is equal to the DIF value corresponding to the unsolicited data, the SCSI layer determines that transmitted data is complete. When the DIF value obtained through calculation is not equal to the DIF value corresponding to the unsolicited data, the SCSI layer determines that transmitted data is not complete, and is tampered or corrupted.

It can be seen from the foregoing process that determining whether the unsolicited data is complete is performed at the SCSI layer, that is, this operation is performed by a software layer. Therefore, a disadvantage of affecting processing rates of other application programs also exists due to occupation of CPU resources.

In this embodiment of the present disclosure, further, to determine integrity of the unsolicited data, before the network interface card writes, in the DMA manner, the buffered unsolicited data into the storage space that corresponds to the destination address corresponding to the unsolicited data, the following operations are further included: acquiring, by the network interface card, a DIF calculation rule corresponding to the unsolicited data, calculating, by the network interface card using the DIF calculation rule, a DIF value corresponding to the unsolicited data, and determining, by the network interface card, whether the DIF value obtained through calculation is equal to a preset DIF value corresponding to the unsolicited data, and if yes, writing, in the DMA manner, the buffered unsolicited data into the storage space that corresponds to the destination address corresponding to the unsolicited data, otherwise, skipping performing a write operation.

In this embodiment of the present disclosure, a DIF operation is performed by a network interface card. That is, a DIF operation is performed by hardware. When hardware performs an operation, CPU resources are not occupied, where the CPU resources are limited. If no CPU resources are occupied when a DIF operation is performed, other application programs can use more CPU resources for processing. Therefore, performing a DIF operation by a network interface card reduces impact on processing rates of other application programs.

In an actual application, the unsolicited data may change in a transmission process, for example, being tampered or corrupted, and there is a potential security threat to some extent. In this embodiment of the present disclosure, to determine integrity of the unsolicited data, before writing the unsolicited data, the network interface card determines whether the DIF value obtained through calculation is equal to the preset DIF value corresponding to the unsolicited data. If yes, the network interface card considers that the unsolicited data is complete, and writes, in the DMA manner, the buffered unsolicited data into the storage space that corresponds to the destination address corresponding to the unsolicited data. Otherwise, the network interface card considers that the received unsolicited data is incomplete, and does not perform a write operation.

In this embodiment of the present disclosure, the unsolicited data may be not all the data to be written into the storage space at the client. Further, in this embodiment of the present disclosure, after the network interface card writes, in the DMA manner, the buffered unsolicited data into the storage space that corresponds to the destination address corresponding to the unsolicited data, the following operations are further included: determining, by the network interface card, a size of the storage space corresponding to the destination address of the to-be-stored data when determining that there is to-be-stored data not written into storage space, adding, by the network interface card, the determined size of the storage space to an R2T command, and sending the command to the client, receiving, by the network interface card, to-be-stored data that is returned by the client according to the R2T command, and writing, by the network interface card, the received to-be-stored data into the storage space corresponding to the destination address of the to-be-stored data.

For example, a size of the to-be-stored data not written into storage space is 72 KB. In this case, the network interface card needs to determine the size of the storage space corresponding to the destination address of the to-be-stored data. Then, the server sends, to the client, an R2T command that carries the determined size of the storage space. After receiving the R2T command, the client can directly send one DATA_OUT message, where the DATA_OUT message carries 72 KB data, or send two DATA_OUT messages, where either DATA_OUT message carries 36 KB data.

Figure 3A:
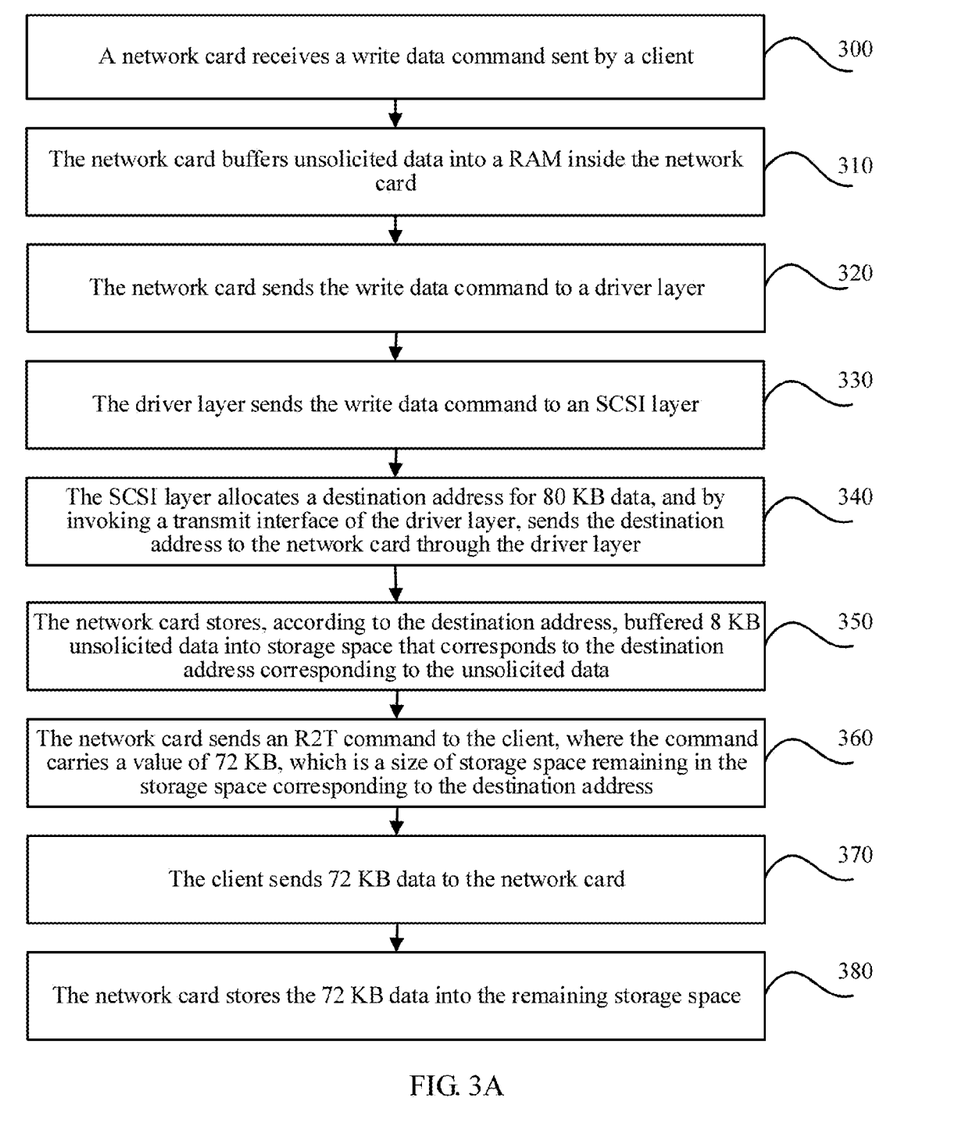
FIG. 3A is a flowchart diagram of a data storage embodiment according to an embodiment of the present disclosure.
Figure 3B:
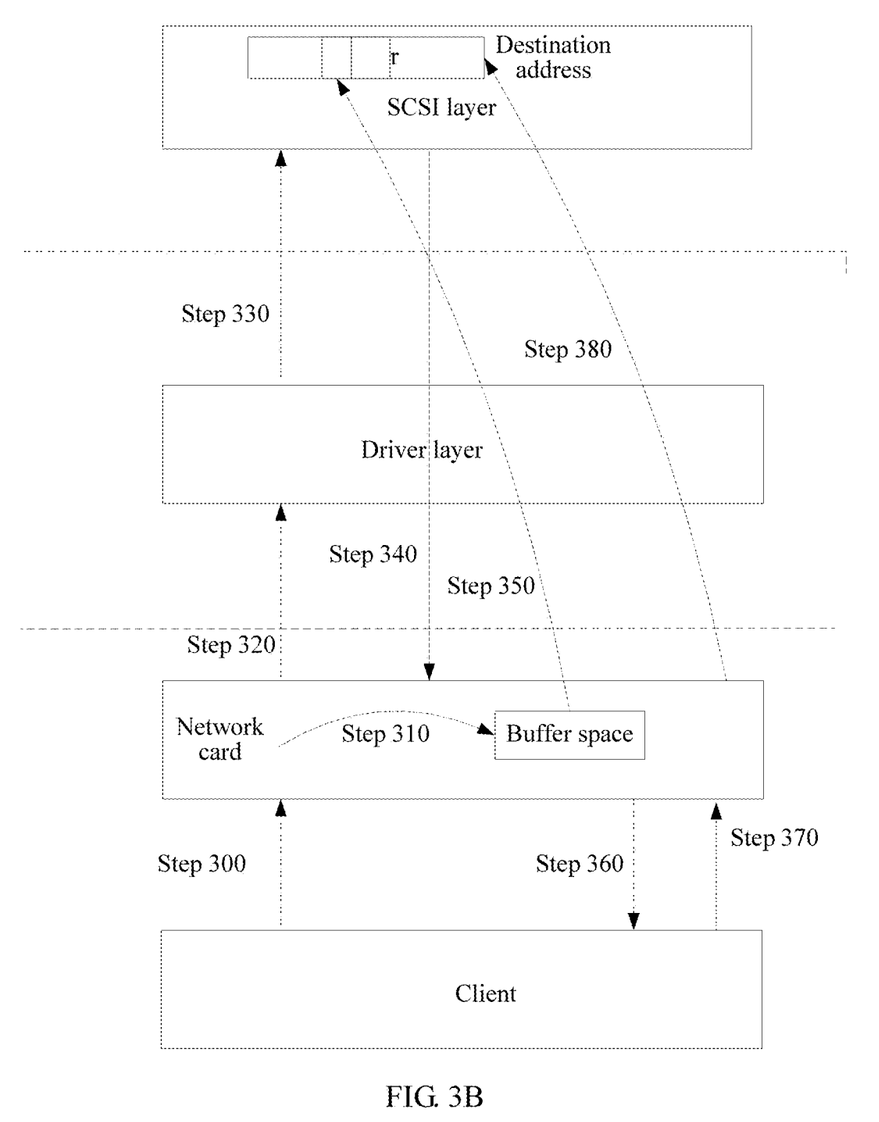
FIG. 3B is a second schematic diagram of a data storage embodiment according to an embodiment of the present disclosure.

For a better understanding of this embodiment of the present disclosure, the following provides a specific application scenario and further describes a data storage process in detail, as shown in FIG. 3A and FIG. 3B.

Step 300: A network card receives a write data command sent by a client.

In this step, the write data command carries a value of 80 KB, which is a size of all data to be written into storage space, and carries 8 KB unsolicited data.

Step 310: The network card buffers unsolicited data into a RAM inside the network card.

Step 320: The network card sends the write data command to a driver layer.

Step 330: The driver layer sends the write data command to an SCSI layer.

Step 340: The SCSI layer allocates a destination address for 80 KB data, and by invoking a transmit interface of the driver layer, sends the destination address to the network card through the driver layer.

Step 350: The network card stores, according to the destination address, buffered 8 KB unsolicited data into storage space that corresponds to the destination address corresponding to the unsolicited data.

Step 360: The network card sends an R2T command to the client, where the command carries 72 KB remaining storage space of the storage space corresponding to the destination address.

Step 370: The client sends 72 KB data to the network card.

Step 380: The network card stores the 72 KB data into the remaining storage space.

Figure 4:
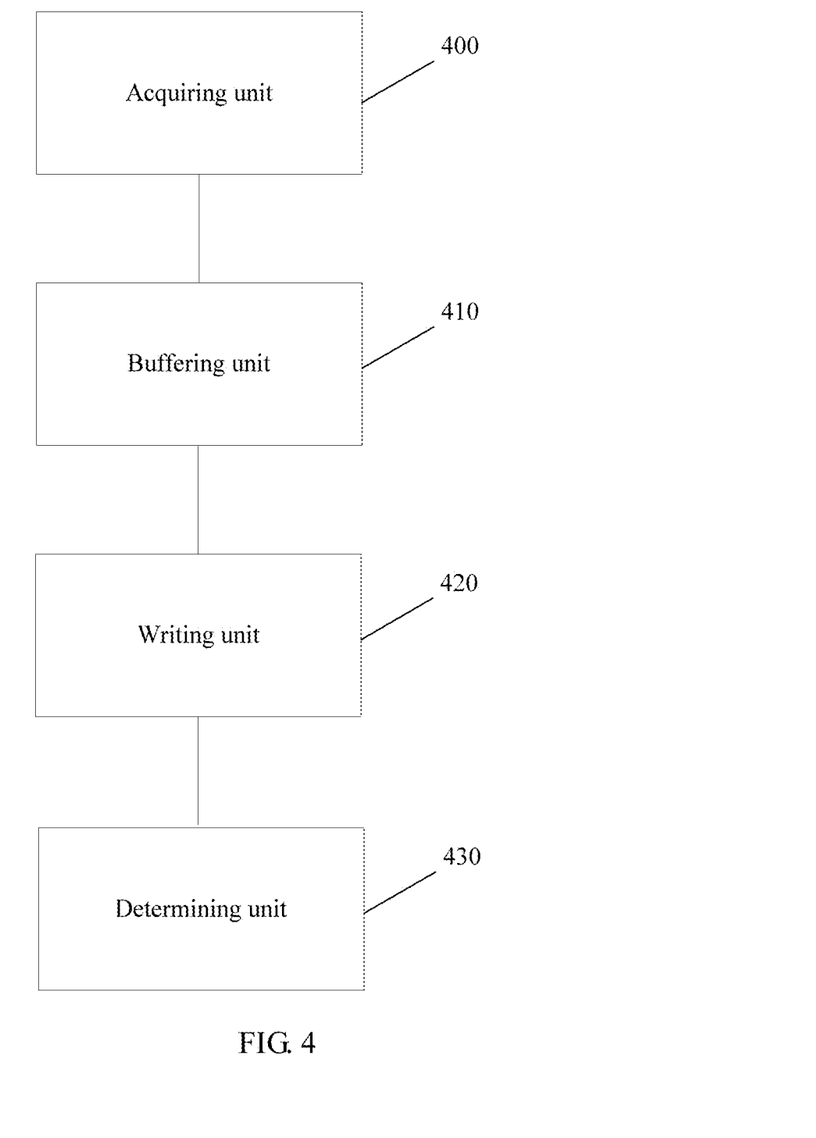
FIG. 4 is a schematic functional and structural diagram of a network interface card according to an embodiment of the present disclosure.

Based on the foregoing technical solution, referring to FIG. 4, an embodiment of the present disclosure provides a network interface card, where the network interface card includes an acquiring unit 400, a buffering unit 410, and a writing unit 420, where the acquiring unit 400 is configured to acquire unsolicited data and a destination address corresponding to the unsolicited data, where the unsolicited data is to-be-stored data, for which a corresponding destination address is not acquired, among data received by the acquiring unit 400. The buffering unit 410 is configured to buffer the acquired unsolicited data into buffer space of the network interface card, and the writing unit 420 is configured to write, in a DMA manner, the buffered unsolicited data into storage space that corresponds to the destination address corresponding to the unsolicited data.

In this embodiment of the present disclosure, optionally, the unsolicited data acquired by the acquiring unit 400 is data carried in a write data command sent by a client, or the unsolicited data acquired by the acquiring unit 400 is data carried in an unsolicited DATA_OUT message sent by a client, where the unsolicited DATA_OUT message is a message that is received by the acquiring unit 400 after receiving the write data command sent by the client and before sending an R2T command to the client.

In this embodiment of the present disclosure, optionally, the buffering unit 410 is further configured to buffer, in a DMA manner, the unsolicited data into space of a RAM of the network interface card, or buffer, in a DMA manner, the unsolicited data into space of a DDR SDRAM of the network interface card.

In this embodiment of the present disclosure, further, the network interface card further includes a determining unit 430, where the determining unit 430 is configured to acquire a DIF calculation rule corresponding to the unsolicited data, calculate, using the DIF calculation rule, a DIF value corresponding to the unsolicited data, and determine that the DIF value obtained through calculation is equal to a preset DIF value corresponding to the unsolicited data.

In this embodiment of the present disclosure, the writing unit 420 is further configured to determine a size of storage space corresponding to a destination address of the to-be-stored data when there is to-be-stored data not written into storage space, add the determined size of the storage space to an R2T command, send the command to the client, receive to-be-stored data that is returned by the client according to the R2T command, and write the received to-be-stored data into the storage space corresponding to the destination address of the to-be-stored data.

Figure 5:
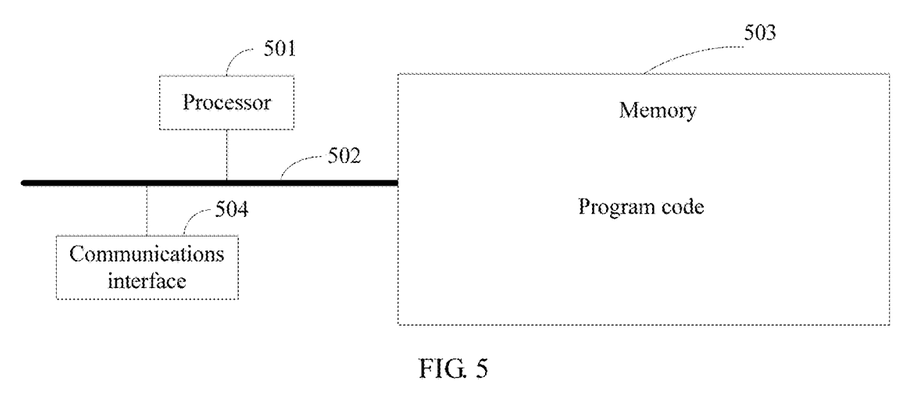
FIG. 5 is a schematic diagram of an entity apparatus of a network interface card according to an embodiment of the present disclosure.

As shown in FIG. 5, FIG. 5 is a diagram of an entity apparatus of a network interface card according to an embodiment of the present disclosure. The network interface card includes at least one processor 501, a communications bus 502, a memory 503, and at least one communications interface 504, where the communications bus 502 is configured to implement connection and communication between the foregoing components, and the communications interface 504 is configured to connect to and communicate with an external device, and the memory 503 is configured to store program code that needs to be executed. When executing the program code in the memory 503, the processor 501 implements the following functions: acquiring unsolicited data, and buffering the acquired unsolicited data into buffer space of the network interface card, where the unsolicited data is to-be-stored data, for which a corresponding destination address is not acquired, among data received by the network interface card, acquiring a destination address corresponding to the unsolicited data, and writing, in a DMA manner, the buffered unsolicited data into storage space that corresponds to the destination address corresponding to the unsolicited data.

In conclusion, the embodiments of the present disclosure provide a data storage method, which includes acquiring, by a network interface card, unsolicited data, and buffering the acquired unsolicited data into buffer space of the network interface card, where the unsolicited data is to-be-stored data, for which a corresponding destination address is not acquired, among data received by the network interface card, acquiring, by the network interface card, a destination address corresponding to the unsolicited data, and writing, in a DMA manner, the buffered unsolicited data into storage space that corresponds to the destination address corresponding to the unsolicited data. In this solution, the buffered unsolicited data is written, in a DMA manner, into the storage space that corresponds to the destination address corresponding to the unsolicited data, and a rate of writing data in a DMA manner is higher than a rate of writing data in a copying manner. Therefore, time required in a data storage process is shortened and a storage efficiency is improved. In addition, because a write operation is performed by hardware of the network interface card, consumption of CPU resources is reduced, which further reduces impact on processing rates of other application programs.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a function in one or more processes in the flowcharts and/or in one or more blocks in the block diagrams.

These computer program instructions may also be loaded onto a computer or another programmable data processing device such that a series of operations and steps are performed on the computer or the other programmable device, thereby generating computer-implemented processing. Therefore, the instructions executed on the computer or the other programmable device provide steps for implementing a function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A data storage method, comprising:
acquiring, by a network interface card, unsolicited data;
buffering, in a direct memory access (DMA) manner, the unsolicited data into a double data rate (DDR) synchronous dynamic random access memory (SDRAM) of the network interface card, the unsolicited data being to-be-stored data, for which a corresponding destination address is not acquired, among data received by the network interface card;
acquiring, by the network interface card, a destination address corresponding to the unsolicited data; and
writing, in the DMA manner, the unsolicited data into storage space that corresponds to the destination address corresponding to the unsolicited data.

2. The method of claim 1, wherein the unsolicited data is data carried in a write data command received from a client.

3. The method of claim 1, wherein the unsolicited data is data carried in an unsolicited DATA_OUT message received from a client, the unsolicited DATA_OUT message is a message received by the network interface card after receiving a write data command from the client and before sending a ready to transfer (R2T) command to the client.

4. A data storage method, comprising:
acquiring, by a network interface card, unsolicited data;
buffering the unsolicited data into a buffer space of the network interface card, the unsolicited data is to-be-stored data, for which a corresponding destination address is not acquired, among data received by the network interface card;
acquiring, by the network interface card, a destination address corresponding to the unsolicited data;
acquiring, by the network interface card, a data integrity field (DIF) calculation rule corresponding to the unsolicited data;
calculating, by the network interface card using the DIF calculation rule, a DIF value corresponding to the unsolicited data;
determining, by the network interface card, that the DIF value obtained through calculation is equal to a preset DIF value corresponding to the unsolicited data; and
writing, in a direct memory access (DMA) manner, the unsolicited data into storage space that corresponds to the destination address corresponding to the unsolicited data.

5. The method of claim 1, wherein after writing the unsolicited data into the storage space that corresponds to the destination address corresponding to the unsolicited data, the method further comprises:
determining, by the network interface card when there is to-be-stored data not written into the storage space, a size of the storage space corresponding to a destination address of the to-be-stored data;
adding, by the network interface card, the size of the storage space to a ready to transfer (R2T) command;
sending the R2T command to a client;
receiving, by the network interface card, to-be-stored data that is returned by the client according to the R2T command; and
writing, by the network interface card, the to-be-stored data into the storage space corresponding to the destination address of the to-be-stored data.

6. A network interface card, comprising:
a communications interface;
a memory configured to store program code;
a communications bus coupled to the communications interface, and the memory; and
a processor coupled to the communications bus and configured to execute the program code to:
acquire unsolicited data and a destination address corresponding to the unsolicited data, the unsolicited data being to-be-stored data for which the destination address is not acquired;
buffer, in a direct memory access (DMA) manner, the unsolicited data into a double data rate (DDR) synchronous dynamic random access memory (SDRAM) of the network interface card; and write, in the DMA manner, the unsolicited data into storage space that corresponds to the destination address corresponding to the unsolicited data.

7. The network interface card of claim 6, wherein the unsolicited data is data carried in a write data command received from a client.

8. The network interface card of claim 6, wherein the unsolicited data is data carried in an unsolicited DATA_OUT message received from a client, the unsolicited DATA_OUT message is a message that is received by the processor after receiving a write data command from the client and before sending a ready to transfer (R2T) command to the client.

9. The network interface card of claim 6, wherein the processor is further configured to:
acquire a data integrity field (DIF) calculation rule corresponding to the unsolicited data;
calculate, using the DIF calculation rule, a DIF value corresponding to the unsolicited data; and
determine that the DIF value obtained through calculation is equal to a preset DIF value corresponding to the unsolicited data.

10. The network interface card of claim 6, wherein the processor is further configured to:
determine a size of the storage space corresponding to a destination address of the to-be-stored data when there is to-be-stored data not written into the storage space;
add the size of the storage space to a ready to transfer (R2T) command;
send the R2T command to a client;
receive to-be-stored data that is returned by the client according to the R2T command; and
write the to be-stored data into the storage space corresponding to the destination address of the to-be-stored data.

11. The method of claim 4, wherein buffering, by the network interface card, the unsolicited data into the buffer space of the network interface card further comprises buffering, by the network interface card and in the DMA manner, the unsolicited data into space of a double data rate (DDR) synchronous dynamic random access memory (SDRAM) of the network interface card.

12. The method of claim 4, wherein the unsolicited data is data carried in a write data command received from a client.

13. The method of claim 4, wherein the unsolicited data is data carried in an unsolicited DATA_OUT message received from a client, the unsolicited DATA_OUT message is a message received by the network interface card after receiving a write data command from the client and before sending a ready to transfer (R2T) command to the client.

14. The method of claim 4, wherein after writing the unsolicited data into the storage space that corresponds to the destination address corresponding to the unsolicited data, the method further comprises:
determining, by the network interface card when there is to-be-stored data not written into the storage space, a size of the storage space corresponding to a destination address of the to-be-stored data;
adding, by the network interface card, the size of the storage space to a ready to transfer (R2T) command;
sending the R2T command to a client;
receiving, by the network interface card, to-be-stored data that is returned by the client according to the R2T command; and
writing, by the network interface card, the to-be-stored data into the storage space corresponding to the destination address of the to-be-stored data.

* * * * *